Figure 1:
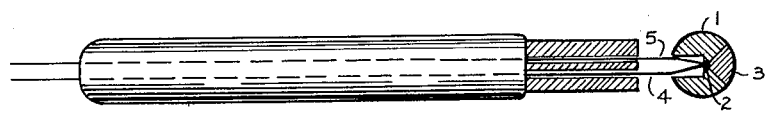

Jan. 29, 1957  E. R. CORNEIL  2,779,189

DETERMINATION OF SOLIDS IN LIQUIDS

Filed April 22, 1953  2 Sheets-Sheet 1

INVENTOR.
ERNEST R. CORNEIL
BY
AGENT

Jan. 29, 1957 E. R. CORNEIL 2,779,189
DETERMINATION OF SOLIDS IN LIQUIDS
Filed April 22, 1953 2 Sheets-Sheet 2

INVENTOR.
ERNEST R. CORNEIL
BY
AGENT

United States Patent Office 2,779,189
Patented Jan. 29, 1957

2,779,189

DETERMINATION OF SOLIDS IN LIQUIDS

Ernest R. Corneil, Stamford Centre, Ontario, Canada, assignor to E. I. du Pont de Nemours and Company, Wilmington, Del., a corporation of Delaware Application April 22, 1953, Serial No. 350,503

5 Claims. (Cl. 73—61)

This invention relates to an analytical method for determining the solids content of dispersions and solutions of film-forming materials and more particularly to the determination of the solids content of polyvinyl resin emulsions and solutions.

Polyvinyl acetate emulsions are aqueous dispersions of polyvinyl acetate solid particles ranging in size from a fraction of 1 micron to around 5 microns or somewhat larger. Such dispersions commonly are made by polymerizing an aqueous emulsion of vinyl acetate in the presence of a small amount of polyvinyl alcohol or other suitable dispersing agent. They also may be made by forming an aqueous emulsion of a polyvinyl acetate solution in a non-aqueous solvent in the presence of a suitable emulsifying agent, with or without subsequent removal of the non-aqueous solvent. A continuous film of polyvinyl acetate may be formed by spreading a polyvinyl acetate emulsion on a solid surface and evaporating off the water. Accordingly, the emulsions find extensive use in coating compositions, adhesives and textile finishes. For such uses generally other ingredients are added including plasticizer, pigments and the like. The emulsions which generally are formed and sold at 40–60% total solid often are diluted with water to around 5–15% solids content at the time of use. For many uses it is desirable to maintain a constant solids content in the emulsion which is being applied, for example, in the formation of a product coated with a polyvinyl acetate film.

Determination of the solids content of a polyvinyl acetate emulsion as heretofore practiced is a tedious and time-consuming process which involves carefully weighing out a sample of the emulsion, completely evaporating off the water and weighing the residue, an operation generally requiring 4 to 8 hours to complete. For control of commercial operations such as coating paper, textiles or the like with polyvinyl acetate emulsion compositions, it has been desirable to have a rapid method for solids determination which can be carried out within a short time such as 1 to 3 minutes by personnel which does not have a high degree of technical training.

An object of the present invention is to provide a quick and relatively accurate method for determining the solids content of a polyvinyl acetate emulsion. A further object is to provide such a method for determining the solids content of dispersions and solutions of film-forming compounds in general. Still further objects will be apparent from the following description of the invention.

In accordance with the present invention, the solids content of a liquid dispersion or solution of a film-forming material is determined by immersing therein a hot solid mass of heat-conductive material and measuring the rate of heat transfer from said mass to the liquid, e. g., by noting the rate of cooling of said mass. I have found that for a given mass heated to a temperature above the boiling point of water and plunged into a polyvinyl acetate emulsion, the rate of cooling will be proportional to the solids content of the emulsion. The proportionality can be determined and the heated solid mass thereby calibrated by a series of trails in each of which the mass at the selected temperature is plunged into the emulsion and cooled to a lower selected temperature, for example, from a temperature of 1500° F. to a temperature of 130.° F. By making a series of such trials, with a series of emulsions of known solids content, made up by diluting the original emulsion, calibration is effected and thereafter the solids content of any emulsion of the same composition can be determined by noting the rate of cooling through the aforesaid temperature range.

Figure 2:
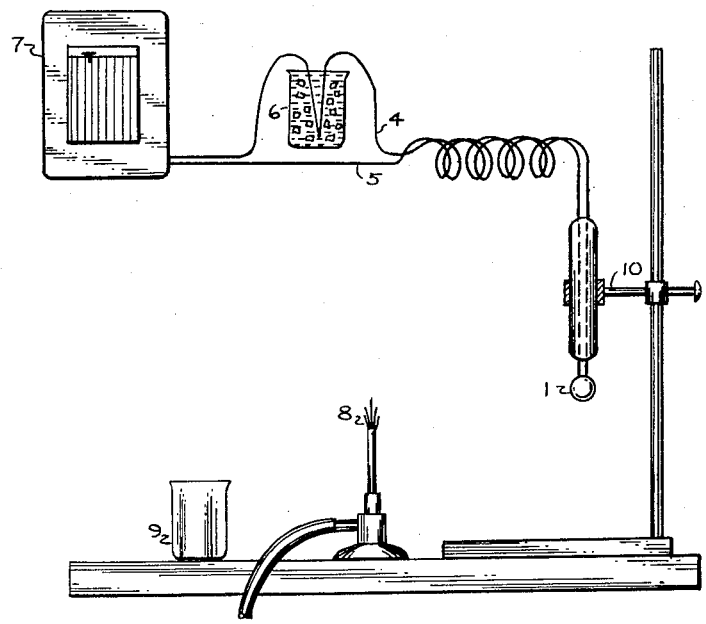
Figure 3:
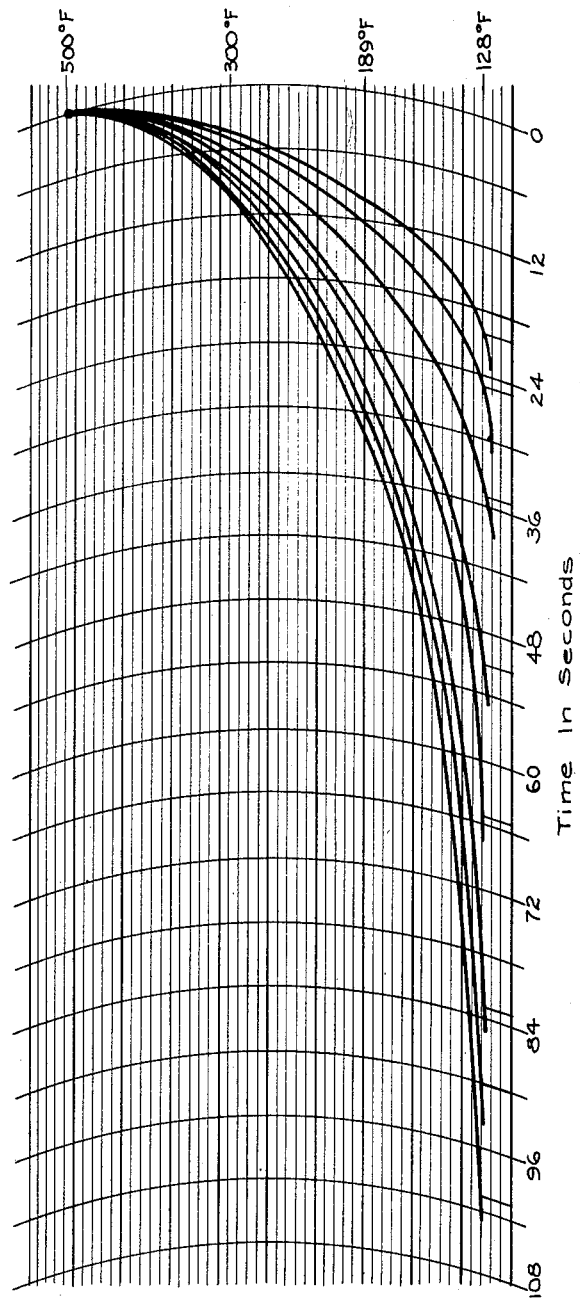

The accompanying drawing is illustrative of the practice of this invention. Figure 1 shows in partial cross-section the mass from which heat is transferred to the liquid. Figure 2 shows diagrammatically a setup for heating the ball and measuring the rate of cooling in the liquid tested. Figure 3 shows a series of temperature-time curves and is a basis for the data in the table.

As an example of the present invention, a polished steel ball 1, three-eighths inch in diameter, was drilled on its diameter to provide for the entrance of an iron-constantan thermocouple 2 which was joined near the center of the ball 1 by welding thereto without the addition of incompatible filler metal 3. The ball was supported in a fixed position 10 and the thermocouple wires 4 and 5 were directed (through a conventional cold junction 6) to a suitable instrument 7 for showing and recording the temperature. The ball then was heated to a temperature above 500° F. by means of a gas flame 8. The gas flame was then removed and, when the ball had cooled to 500° F. it was immediately plunged into a 50 cc. volume of polyvinyl acetate emulsion in beaker 9, the initial temperature of which was 25° F. The time required for the temperature of the ball to decrease to a selected temperature, namely 128° F. then was noted. By repeating this operation 8 times, each time diluting the emulsion by adding a measured amount of water, the time of cooling for each different solids content was determined. The following data was obtained: (See also Figure 3.)

| Solids content (percent by weight): | Cooling time (seconds) |
|---|---|
| 56.0 | 100 |
| 54.7 | 90 |
| 53.2 | 83 |
| 50.4 | 65 |
| 46.4 | 51 |
| 40.0 | 35 |
| 35.1 | 25 |
| 28.0 | 20 |

The same ball was used for each determination and each time, before use, adhering polyvinyl acetate was completely removed from the ball surface. The above data established a calibration curve for the steel ball with respect to the emulsion composition employed. Thereafter, the solids contents of the emulsion, diluted with water to solids contents within the range of 28 to 56% solids, could be determined by repeating the operation, noting the cooling time and reading the solids content from the curve. The calibration curve generally is not a straight line, as the time required for cooling over a given temperature interval usually is greater for a high solids content than for a low one. Hence, the ball must be calibrated over the entire solids content range it is desired to measure.

In another method of practicing the invention, the rate of heat transfer between the heated solid mass and the liquid is measured by measuring the temperature increase in the liquid when the hot solid mass is brought in contact therewith, for a preselected period of time. For example, in one modification of this method, a thermometer is located at a fixed point in the body of liquid to be tested and a heated steel ball is immersed in the liquid at a preselected distance (e. g., 0.2 to 1 inch) from the thermometer. The temperature as indicated by the thermometer is noted before the ball is immersed and again at a preselected time, e. g., 10 to 60 seconds after immersion of the heated ball. In each test, the distance between the immersed ball and the thermometer must be substantially constant. In this method, also, the respective temperatures of the heated ball and the liquid must be the same for each test.

The cooling time/solids content relationship also will vary for different film-forming materials, e. g., polyvinyl acetate and polyvinyl alcohol. Hence, a separate calibration should be made for each film-forming material. In some cases calibration is unnecessary. For example, a polyvinyl acetate emulsion may be diluted with water until it has a consistency (solids content) suitable for its intended purpose and then tested to determine the cooling rate of the ball therein. Thereafter, the diluted emulsion employed may be tested from time to time by the same method and if the cooling time is shorter than the standard time established by the original test, dilution is indicated. Conversely, if the observed cooling time is longer than standard undiluted emulsion should be added.

The cooling time may be determined by observing a visual temperature indicator, using a stop watch to measure the time. More conveniently, a conventional temperature-recording device which draws a time-temperature curve on a moving sheet of paper may be utilized.

The steel ball utilized as heat-conductive mass generally becomes coated with a film of polyvinyl acetate during the determination and this film should be removed, for example, by washing with a solvent or by polishing with a fine abrasive before the next determination is made.

My invention is useful for solids determination, not only in polyvinyl acetate emulsions but also in dispersions and solutions of various film-forming materials such as resins (both natural and synthetic), starches, gums, lacquers and the like. The solvent or dispersing liquid may be aqueous or non-aqueous. For example, I have utilized it to measure the solids content of natural rubber latex, "G. R. S.," synthetic rubber latex, polyvinyl chloride aqueous dispersion, aqueous dispersions or solutions of polyvinyl alcohol, starch and glue, and methanol solutions of polyvinyl acetate.

The liquid compositions which may be tested by my method may contain the solid film-forming material in (1) true solution, (2) in colloidal dispersion or (3) in non-colloidal dispersion in a non-solvent liquid. The solid material, the concentration of which is to be determined, must form a continuous solid film on evaporation of the liquid portion of the composition. Herein and in the appended claims I use the term "liquid dispersion of a film-forming material" to include true solutions as well as colloidal or non-colloidal dispersions of a solid material in a liquid, from which a solid film may be formed by evaporation of said liquid.

While generally it is preferred to utilize a steel ball as the heat-conductive mass to be immersed in the liquid to be tested, any solid, heat-conductive mass which is substantially not chemically reactive with, or soluble in, the materials to be tested and is dimensionally stable at the temperatures employed may be utilized; and such mass may be of any desired size and shape. The volume of the solid heat-conductive mass, however, should be considerably less that the volume of the liquid in which it is immersed in testing; namely, 0.001 to 0.1 of the volume of the liquid. I generally prefer to utilize a steel ball of $3/16$ to $1/2$ inch in diameter. The temperature of the solid heat-conductive mass at the time of immersion in the liquid should be above the boiling point of the liquid material (for example, above 212° F. in the case of an aqueous dispersion or solution) and preferably from 100 to 1500° F. above the boiling point of the liquid. In testing polyvinyl acetate, utilizing a steel ball of the above preferred dimensions, I prefer an immersion temperature of 500 to 1000° F.

Preferably the heated solid mass is immersed completely beneath the surface of the liquid material as rapidly as possible. However, if desired, the mass may be only partly immersed in the material, provided that in each determination the depth of penetration into the liquid is precisely the same.

In each determination, the cooling time is determined for a definite preselected temperature range. While this may be of any desired extent, I prefer to select a range wherein the solid heat conducting mass is cooled to a temperature below the boiling point of the liquid tested and below the melting point of the solid film-forming material, preferably 1 to 180° F. below said boiling point. For testing polyvinyl acetate emulsion with a heated steel ball I prefer a cooling range of 100 to 1000° F., the lower temperature of the range being 32 to 212° F.

I claim:

1. A method for determining the solids content of a polyvinyl acetate emulsion which comprises immersing therein a heated metal mass having a volume not more than 0.1 of the volume of said emulsion, heated to a temperature of at least 500° F. and recording the time required for the immersed metal mass to cool to a temperature not higher than 211° F.

2. A method for determining the solids content of a liquid dispersion of a film forming vinyl resin which comprises immersing in said dispersion a solid mass of heat conductive material heated to a temperature 100° F. to 1500° F. above the boiling point of said liquid and recording the time required to cool said heated mass through a preselected temperature range to a temperature 0° to 180° F. below said boiling point, said heat conductive material being substantially inert towards the components of said dispersion.

3. A method for determining the solids content of a liquid dispersion of a film forming material which comprises immersing in said dispersion a steel ball the volume of which ball is 0.001 to 0.1 of the volume of said dispersion and the temperature of said ball is 500 to 1500° F. at the moment of immersion, and recording the time required to cool said ball from said temperature at time of immersion until the temperature of said ball has dropped to 32 to 211° F., the ball temperatures being recorded as developed at a point in the interior of the ball.

4. In a method for determining the solids content of a liquid dispersion of a film forming vinyl resin the steps which comprise bringing said dispersion into contact with a heated solid mass of heat conductive material substantially inert to the components of said dispersion and cooling said solid mass from a temperature at least 100° F. above the boiling point of the liquid of said dispersion to a temperature 0 to 180° F. below said boiling point and recording the rate of heat transfer between said heated solid mass and said dispersion on a moving sheet of paper in a temperature recording means actuated by a thermocouple having a hot junction in said heated solid mass and a cold junction maintained outside said dispersion between said heated solid mass and said recording means.

5. In a method for determining the solids content of a liquid dispersion of a film forming vinyl resin the steps which comprise bringing said dispersion into contact with a heated steel ball the volume of which is 0.001 to 0.1 of the volume of said dispersion, said ball being substantially inert to said dispersion, and cooling said ball from a temperature between 500 to 1500° F. at the moment of contact of said ball and said dispersion to a temperature of 32 to 211° F. and recording the rate of heat transfer between said ball and said dispersion on a moving sheet of paper in a temperature recording means actuated by a thermocouple having a hot junction in said heated steel ball and a cold junction maintained outside said dispersion between said heated solid mass and said recording means.

References Cited in the file of this patent

UNITED STATES PATENTS

| 1,836,316 | Esau | Dec. 15, 1931 |
| 2,475,138 | Hood et al. | July 5, 1949 |
| 2,717,515 | Pesante | Sept. 13, 1955 |

FOREIGN PATENTS

| 682,822 | Great Britain | Nov. 19, 1952 |

OTHER REFERENCES

Elementary Treatise on Physics, by Ganot, 15th edition, 1898 (pp.445–448). (Copy in Div. 36.)